(12) United States Patent
Hedlund et al.

(10) Patent No.: US 11,290,929 B2
(45) Date of Patent: Mar. 29, 2022

(54) METHOD AND SYSTEM RELATING TO HANDOVER (71) Applicant: Telefonaktiebolaget LM Ericsson (publ), Stockholm (SE)

(72) Inventors: Leo Hedlund, Älvsjö (SE); Anders Johansson, Hässelby (SE); Mikael Jonsson, Vällingby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/568,911

(22) PCT Filed: May 22, 2015

(86) PCT No.: PCT/SE2015/050591
§ 371 (c)(1),
(2) Date: Oct. 24, 2017

(87) PCT Pub. No.: WO2016/190790
PCT Pub. Date: Dec. 1, 2016

(65) Prior Publication Data
US 2018/0124657 A1     May 3, 2018

(51) Int. Cl.
*H04W 36/00*     (2009.01)
*H04W 72/04*     (2009.01)
*H04W 52/40*     (2009.01)

(52) U.S. Cl.
CPC ....... *H04W 36/0072* (2013.01); *H04W 52/40* (2013.01); *H04W 72/0473* (2013.01)

(58) Field of Classification Search
None
See application file for complete search history.

(56) References Cited

U.S. PATENT DOCUMENTS

2009/0318153 A1* 12/2009 Maheshwari ......... H04W 52/40
    455/436
2011/0026492 A1* 2/2011 Frenger ............. H04W 36/0085
    370/331

(Continued)

FOREIGN PATENT DOCUMENTS

WO    2006098665 A1    9/2006
WO    2014046591 A1    3/2014

(Continued)

OTHER PUBLICATIONS

Reeta Chhatani, Beamforming and Transmission Power optimization, Dec. 2013, IJAREEIE, vol. 2, Special Issue 1, p. 594 (Year: 2013).*

(Continued)

*Primary Examiner* — Kouroush Mohebbi
(74) *Attorney, Agent, or Firm* — Withrow & Terranova, PLLC (57) ABSTRACT

A method relating to handover in a communication system is disclosed. The method comprises establishing that a communication device is involved in a handover process from a first cell to a second cell, and increasing at least one of diversity and transmission power of a scheduling assignment transmitted on physical downlink control channel resources, wherein the physical downlink control channel resources are multiplexed with data resources in one or more orthogonal frequency division multiplexing, OFDM, symbols and wherein the scheduling assignment is specific for the communication device. A corresponding communication system, computer programs and computer program products are also disclosed.

26 Claims, 6 Drawing Sheets

(56) References Cited

U.S. PATENT DOCUMENTS

| | | | |
|---|---|---|---|
| 2013/0310037 A1 | 11/2013 | Ji et al. | |
| 2014/0269595 A1 | 9/2014 | Lee et al. | |
| 2015/0131565 A1* | 5/2015 | Nakashima | H04L 1/0026 370/329 |
| 2015/0181568 A1* | 6/2015 | Seo | H04L 5/0053 370/329 |
| 2016/0057660 A1* | 2/2016 | Hong | H04W 36/0016 455/436 |
| 2016/0198385 A1* | 7/2016 | Braun | H04W 36/0094 455/437 |
| 2017/0367012 A1* | 12/2017 | Muller | H04W 52/40 |
| 2018/0109990 A1* | 4/2018 | Martin | H04W 76/14 |

FOREIGN PATENT DOCUMENTS

| | | |
|---|---|---|
| WO | 2014158002 A1 | 10/2014 |
| WO | 2016114694 A1 | 7/2016 |

OTHER PUBLICATIONS

Author Unknown, "Technical Specification Group Radio Access Network; Further Advancements for E-UTRA Physical Layer Aspects (Release 9)," Technical Report 36.814, Version 1.5.0, 3GPP Organizational Partners, Nov. 2009, 50 pages.

Research in Motion UK Limited, "R2-094282: Discussion of Handover for CoMP," 3GPP Organizational Partners, Aug. 24-28, 2009, 6 pages, Shenzhen, China.

Toskala, Antti, "Chapter 6: Physical Layer," WCDMA for UMTS: Radio Access for Third Generation Mobile Communications (book), 3rd Edition, 2004, John Wiley & Sons, Ltd., 43 pages.

International Search Report and Written Opinion for International Patent Application No. PCT/SE2015/050591, dated Feb. 18, 2016, 14 pages.

Examination Report for Indian Patent Application No. 201747045324, dated Mar. 12, 2020, 6 pages.

Examination Report for European Patent Application No. 15729958.7, dated May 28, 2020, 7 pages.

* cited by examiner

METHOD AND SYSTEM RELATING TO HANDOVER

This application is a 35 U.S.C. § 371 national phase filing of International Application No. PCT/SE2015/050591, filed May 22, 2015, the disclosure of which is incorporated herein by reference in its entirety.

TECHNICAL FIELD

The technology disclosed herein relates generally to the field of wireless communication networks and in particular to handover procedures in such networks.

BACKGROUND

Long Term Evolution (LTE) is a radio access technology standardized by 3rd Generation Partnership Project (3GPP). LTE only supports a Packet Switched (PS) domain and is intended to eventually provide all services in the packet switched domain. LTE has no Circuit Switched (CS) domain in contrast to previous 3GPP systems, and circuit switched voice calls are therefore still supported by 2G and 3G networks on behalf of the LTE network. A user with an LTE-subscription that is making or receiving a voice call is hence redirected to the 2G or 3G network. Voice over LTE (VoLTE) is an Internet Protocol (IP) Multimedia Subsystem (IMS)-based specification intended for providing speech services over the packet switched domain.

It has been observed that the handover procedure in LTE radio access networks is vulnerable to interference, i.e. when the interference in the radio access network increases the handover performance degrades. A handover failure resulting in a dropped call is a source of user dissatisfaction and it is therefore important to have a very high handover success rate. Handover success rate is one of the most important key performance indicators (KPIs). To meet the performance expectations of the LTE users, there is a need for solutions which increase handover robustness in LTE.

SUMMARY

An objective of the present disclosure is to solve or at least alleviate the above mentioned problem.

The objective is according to an aspect achieved by a method relating to handover in a communication system. The method comprises establishing that a communication device is involved in a handover process from a first cell to a second cell, and increasing at least one of diversity and transmission power of a scheduling assignment transmitted on physical downlink control channel resources, wherein the physical downlink control channel resources are multiplexed with data resources in one or more orthogonal frequency division multiplexing, OFDM, symbols and wherein the scheduling assignment is specific for the communication device.

The method provides an improved robustness at handover for a communication device using the enhanced physical downlink control channel (EPDCCH) of LTE. In particular, the method provides an improved robustness for scheduling assignments, in particular handover-related scheduling assignments, in an interference limited part of a radio access network, and also in a coverage limited part of a radio access network. The method thus ensures robustness in handover in high-interference environments as well as in areas having limited coverage. The method further provides the improved handover robustness with retained overall system capacity and in a highly resource efficient way, by using one or both of the robustness increasing schemes of increasing the diversity and increasing the transmission power. The robustness increasing schemes may for instance be used only at some selected occasions.

The objective is according to an aspect achieved by a computer program for a communication system for handover in the communication system. The computer program comprises computer program code, which, when executed on at least one processor of the communication system causes the communication system to perform the method as above.

The objective is according to an aspect achieved by a computer program product comprising a computer program as above and a computer readable means on which the computer program is stored.

The objective is according to an aspect achieved by a communication system for handover. The communication system is configured to establish that a communication device is involved in a handover process from a first cell to a second cell, and to increase at least one of diversity and transmission power of a scheduling assignment transmitted on physical downlink control channel resources, wherein the physical downlink control channel resources are multiplexed with data resources in one or more orthogonal frequency division multiplexing, OFDM, symbols and wherein the scheduling assignment is specific for the communication device.

Further objectives, features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a comprehensive understanding of the present teachings, some basics of LTE is provided in the following, with reference to FIGS. 1 and 2, along with describing aspects according to the present teachings. The LTE standard is based on Orthogonal Frequency Division Multiplexing (OFDM) in the downlink and Single Carrier-Frequency Division Multiple Access (SC-FDMA) in the uplink.

Figure 1:
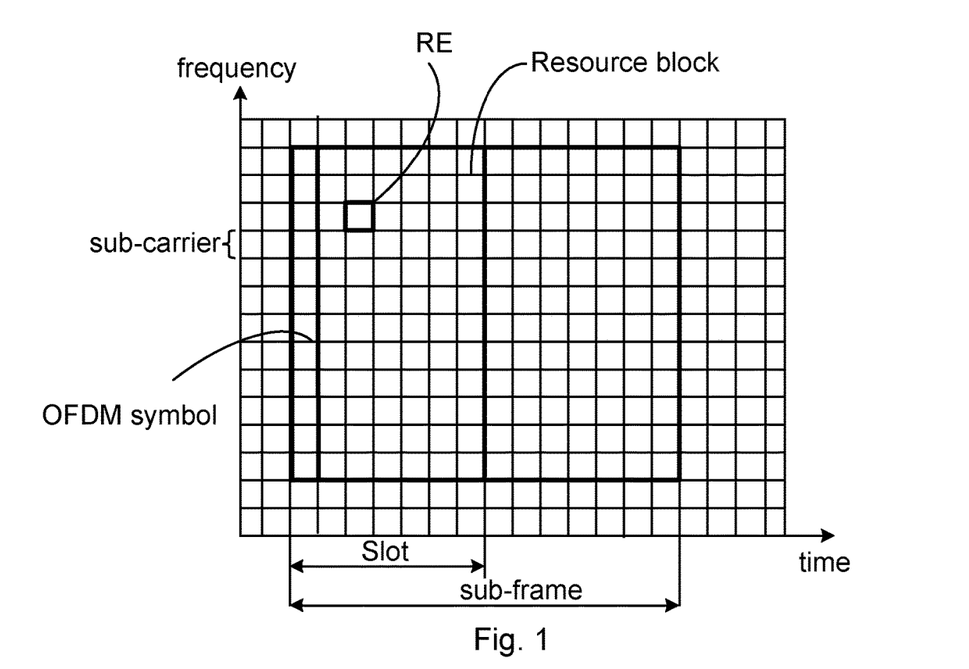
FIG. 1 illustrates an OFDM resource grid.

FIG. 1 illustrates the structure of the OFDM resources. In the time domain (horizontal axis), one sub-frame comprises two slots, and each slot in turn comprises seven OFDM symbols. One resource block comprises twelve sub-carriers in the frequency domain (vertical axis) and one slot in the time domain, which gives 84 (12×7) resource elements (RE) in each resource block (RB). A scheduling block comprising 14 OFDM symbols, i.e. one sub-frame, is the smallest resource unit that can be allocated to a UE. In the time domain in the downlink, one sub-frame is divided into a number of OFDM symbols. One OFDM symbol then consists of a number of sub-carriers in the frequency domain.

Figure 2:
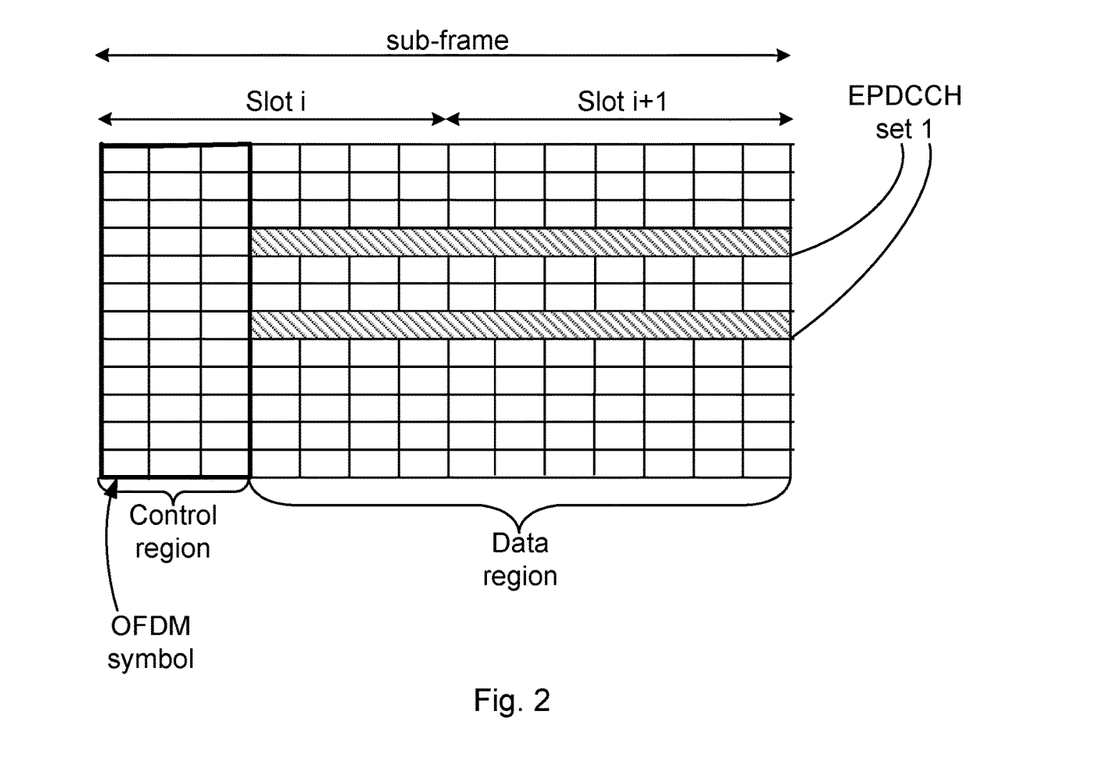
FIG. 2 illustrates a control region of an OFDM sub-frame.

FIG. 2 illustrates a control region and a data region of a sub-frame. In LTE, no dedicated data channels are used; instead shared channel resources are used in both downlink and uplink. These shared resources are controlled by a scheduler that assigns different parts of the downlink and uplink shared channels to different user equipment (UEs) for reception and transmission respectively.

According to the original LTE release, Rel-8, resource assignment information for the data on the shared channels is transmitted in a control region covering a few OFDM symbols in the beginning of each downlink sub-frame. This control region, which is indicated in FIG. 2, may comprise up to three OFDM symbols (or up to four OFDM symbols in case of 1.4 MHz system bandwidth) in the first slot of each downlink sub-frame, which comprises two slots (denoted Slot i and Slot i+1 in the figure). Data is transmitted in a data region covering the rest of the OFDM symbols in the sub-frame. The size of the control region is set per sub-frame. The size is signaled as a specific control format indicator (CFI) to the UE for each sub-frame on the so called Physical CFI Channel (PCFICH).

The PDCCH is a channel that carries a message called Downlink Control Information (DCI) which comprises the resource assignments ("pointers") for one UE or a group of UEs. The DCI messages carries information about resource scheduling for uplink and downlink, transmit power commands, type of modulation used etc. Multiple PDCCHs may be transmitted in a single sub-frame which PDCCHs may or may not all be relevant to a particular UE. Each assignment, i.e. each "pointer" to a particular set of REs where the data is actually sent, is thus transmitted on the PDCCH in the control region. Since, as mentioned, there may typically be multiple PDCCHs in each sub-frame, the UEs will be required to monitor the PDCCHs to be able to detect the assignments directed to them and in that way being able to "find" the set of REs comprising the data directed to them (data waiting for it on the PDSCH) or if it has been allocated specific resources on the physical uplink shared channel (PUSCH).

In LTE Rel-11 a new downlink control channel, denoted enhanced physical downlink control channel (EPDCCH), was added to the standard. This channel can be used to transmit UE-specific assignments for those UEs that are EPDCCH capable. The EPDCCH channel is multiplexed with a downlink shared channel, denoted physical downlink shared channel (PDSCH), covering some or all the OFDM symbols in a sub-frame except for the OFDM symbols of the control region used by PDCCH. Similar to PDCCH there are also typically multiple EPDCCHs in each sub-frame and the (EPDCCH capable) UEs will be required to monitor the EPDCCHs to be able to detect UE-specific assignments directed to them and in that way being able to "find" the data directed to them.

An EPDCCH is mapped to a number of enhanced control channel elements (ECCEs), similar to PDCCH mapping to control channel elements (CCEs). EPDCCH is furthermore link adapted using different ECCE aggregation levels in the same way as PDCCH is using CCE aggregation levels. Differences between EPDCCH and PDCCH are that EPDCCH is only used for UE-specific assignments and is multiplexed with PDSCH and is located in the data region, while PDCCH can be used for both UE-specific assignments and common assignments and is located in the control region in the beginning of each sub-frame. Furthermore, the EPDCCH is more flexible than the PDCCH allowing for e.g. dynamic capacity, beamforming and ICIC, which is not possible for PDCCH. For instance, since the EPDCCH is multiplexed with the PDSCH in the data region, and is UE specific, beamforming may be applied for the EPDCCH.

As mentioned above, the EPDCCH is mapped to a number of ECCEs. More specifically, the scheduling assignments and other control information of the EPDCCH are mapped to the ECCEs, which are mapped to the physical resource elements (REs). The scheduling assignment of each UE may be interleaved in 1, 2, 4, 8, 16 or 32 ECCEs; the ECCE aggregation level is said to be 1, 2, 4, 8, 16 or 32. Stated differently, the EPDCCH consists of an aggregation of 1, 2, 4, 8, 16 or 32 ECCEs. These six different alternatives are herein referred to as aggregation level 1, 2, 4, 8, 16 and 32 respectively. The UE finds the particular EPDCCH that is specific to it by monitoring a set of EPDCCH candidates, which is a set of ECCEs on which an EPDCCH could be mapped, in every sub-frame. For each value of the aggregation level, each UE has a specific search space of allowed ECCEs that can be used to send the control message. The UE then blindly decodes all possible combinations of aggregation levels and allowed ECCEs.

The variable size achieved by the different aggregation levels is used to adapt the coding rate to the required block error rate (BLER) level for each EPDCCH. The total number of available ECCEs in a sub-frame will vary depending on, among other things, the number of OFDM symbols used for the control region: the more OFDM symbols used for control, the less OFDM symbols are available for the data region. The ECCEs which make up an EPDCCH may be spread in time and frequency in a pseudo random manner within the data region.

The EPDCCH may be transmitted on specific resource elements and there is localized transmission thereof and distributed transmission. The EPDCCH has one or more ECCEs, depending on the aggregation level. One ECCE typically has four enhanced resource element groups (EREGs), and each EREG comprises nine resource elements. Referring again to FIG. 2, each UE that is configured to use EPDCCH, may have one or two EPDCCH sets (one set indicated in the FIG. 2), wherein each set comprises 2, 4 or 8 PRB-pairs in the data region. Each pair of physical resource blocks (PRBs) of a TTI comprises 16 EREGs. For the localized transmission of EPDCCH, the EREGs are clustered in the same PRB, while for the distributed transmission of EPDCCH, the EREGs are using at least one pair of PRBs.

It has been observed in live networks that the handover procedure in LTE is vulnerable to interference, i.e. when the interference in the radio network increases the handover performance degrades. In view of handover, it has been identified during field activities that it is the assignment to the Handover Command via the PDCCH that has shown to be the weak spot. This vulnerability is expected to also appear when the Handover Commands are assigned via the 3GPP Rel-11 EPDCCH since also this channel will be subject to increased interference during handover. If the UE fails to receive the scheduling assignment, then it will not make the handover and it will most likely loose its connection. Failed handovers and as a consequence loss of connection, create great dissatisfaction among the users. There is a need for solutions which maximize handover robustness in LTE. The present teachings provides ways to maximize handover robustness in a resource efficient way compared to a more general increase of the system robustness. Resources may be spent on or action be taken for increasing the robustness only during the critical parts of the connection which imply minimal impact on system capacity.

Briefly, in various embodiments, methods are provided for making the EPDCCH, or more generally a physical downlink control channel, the resources of which are multiplexed with data resources, more robust towards interference by increasing the ECCE aggregation level (more robust coding),
increasing the EPDCCH power,
repeating the EPDCCH assignments (repetition coding), or
enforcing distributed EPDCCH The above schemes may be used, alone or in any combination, for UEs involved in handover. As a particular example, handover related Scheduling Assignments on the EPDCCH can be made more robust towards interference.

Embodiments of methods according to the present teachings may be implemented by utilizing information already available in the wireless communication network, e.g. in a node such as an evolved Node B (eNodeB) thereof. The method strengthens the handover performance not only in an interference limited part of the wireless communication network, but also in areas suffering from bad coverage.

Figure 3:
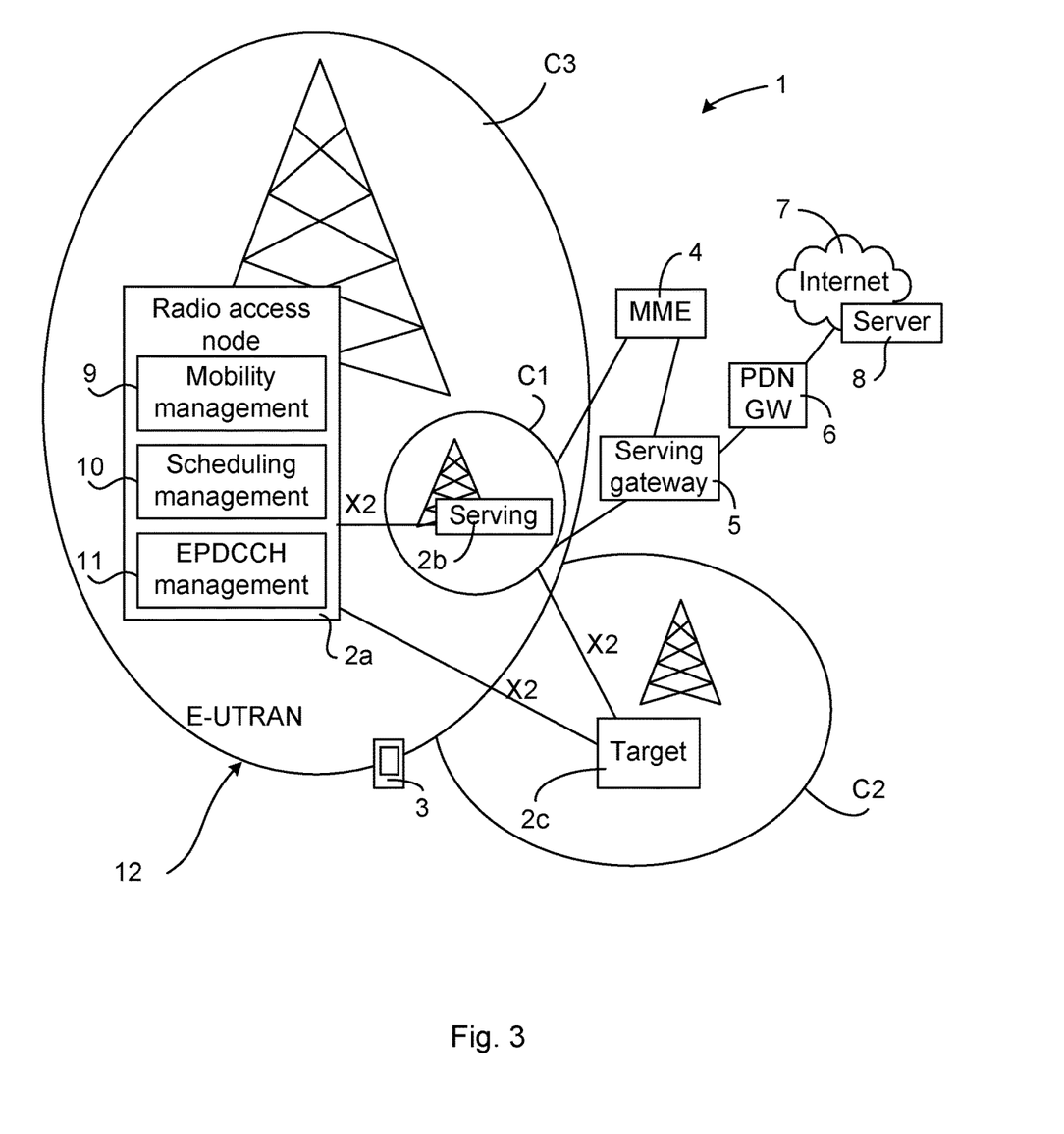
FIG. 3 illustrates schematically a communication system in which embodiments of the present disclosure may be implemented.

FIG. 3 illustrates schematically a communication system in which embodiments of the present disclosure may be implemented. The communication system 1 comprises a radio access network 12, illustrated in the figure as implementing Evolved Universal Terrestrial Radio Access Network (E-UTRAN). The radio access network 12 comprises a number of radio access nodes 2a, 2b, 2c, which are interconnected with each other, and able to exchange communication e.g. over an X2 interface.

The radio access nodes 2a, 2b, 2c provide wireless communication to a number of communication devices 3, each radio access node 2a, 2b, 2c providing communication coverage in one or more geographical areas (typically denoted cells).

In the FIG. 3, three such cells are indicated: a first cell C1 controlled by a first radio access node 2b, a second cell C2 controlled by a second radio access node 2c and a third cell C3 controlled by a third radio access node 2a. It is noted that one of the radio access nodes could control several cells, e.g. in another configuration, the third radio access node 2a could control e.g. both the first cell C1 and the third cell C3. In the following the radio access nodes 2a, 2b, 2c are exemplified by eNodeBs. Handover may be performed between cells allocated to the same eNodeB (intra eNodeB handover) or between cells allocated to different eNodeBs (inter eNodeB handover). In the following, inter eNodeB is used as example, but it is noted that the present teachings may be used for intra eNodeB handover as well. The eNodeB 2a, 2b, 2c may be a serving eNodeB for some communication devices 3 and a target node for others. A serving eNodeB handles the connection for a communication device 3, and a candidate eNodeB is a node to which a communication device 3 may be handed over from another eNodeB. In the FIG. 3, a first eNodeB 2b is indicated as being the serving eNodeB for the communication device 3, while a second eNodeB 2C is a target eNodeB for this communication device 3. Once the communication device 3 has a, in some sense, better connection to the target eNodeB 2c, then a handover is made to this eNodeB 2c, which thus becomes the serving eNodeB for the communication device 3.

The communication devices 3 may comprise any type of device able to communicate wirelessly with the eNodeB, examples of which comprise smart phones, laptops, tablet computers etc. The communication device 3 is in the following also denoted user equipment (UE).

The communication system 1 comprises a core network comprising nodes such as Mobility Management Entity (MME) 4 and serving gateway 5 and packet data network gateway (PDN-GW) 6. The PDN-GW 6 provides connectivity to external packet data networks, e.g. a cluster of servers, which is sometimes referred to as a "cloud". One server of such cluster of servers (such as the Internet, schematically indicated at reference numeral 7) is indicated at reference numeral 8.

FIG. 3 also indicates logical parts of the eNodeB 2a, 2b, 2c that may be used according to various embodiments according to the present teachings. In particular, a mobility management 9, a scheduling management 10 and an EPDCCH management 11 are illustrated.

The mobility management 9 has information about each UE, in particular whether or not a UE 3 is involved in a handover or not. This information for each UE 3 is known by the serving eNodeB 2b and by a prepared target eNodeB 2C. A target eNodeB 2C may e.g. be prepared for a handover by receiving a handover request message from the serving (source) eNodeB 2b.

The scheduling management 10 comprises information regarding what to be scheduled for an UE 3 in the next transmission time interval (TTI), e.g. whether a signaling radio bearer (SRB) or a data radio bearer (DRB) is to be scheduled. The TTI (one sub-frame) is the smallest time unit in which an uplink or downlink transmission can be scheduled.

The scheduling management 10 also comprises information on if a UE 3 is monitoring EPDCCH in the next TTI. This since the UE 3 has been configured (by the eNodeB 2a) to, for instance, monitor EPDCCH for UE specific scheduling assignments in all sub-frames or only in some sub-frames. The UE is then semi-statically assigned EPDCCH resources. This configuration may be performed by the eNodeB 2a using e.g. Radio Resource Control (RRC) signaling.

The EPDCCH management 11 comprises a functionality to set the EPDCCH aggregation level and the transmission power of EPDCCH. The EPDCCH management 11 may also comprise functionality for repeating the EPDCCH assignments (repetition coding), and for enforcing distributed EPDCCH. These different actions may be applied, in any combination or as any single action, for increasing the robustness of the EPDCCH.

The repetition of EPDCCH assignments are described a bit more in the following. The EPDCCH assignments may be mapped to a number of search spaces (or search space locations) in a TTI, i.e. the assignment is transmitted multiple times in one TTI. In this EPDCCH scheme for increasing robustness, the same assignment may thereby be sent repeatedly in the same TTI. It is noted that the repeated assignment may be sent using different aggregation levels or using same aggregation level. For instance, the assignment to be sent e.g. twice in a sub-frame, may be sent with a first aggregation level and with a second aggregation level, wherein the first and second aggregation level may be different or identical. This results in that the assignment is sent multiple times with different coding rates or with same coding rates.

Various embodiments of a method according to the present teachings may be implemented in different ways and with different levels of precision.

Some basic approaches can be to apply the EPDCCH robustness improvement (more robust coding, increased power, repetition coding and/or enforcing distributed EPDCCH) for all Scheduling Assignments to an UE involved in handover or to apply the EPDCCH robustness scheme for all SRB Scheduling Assignments.

A more resource efficient option, described more detailed later, is to combine information regarding "UE in handover" and "SRB to be scheduled" and only apply the EPDCCH robustness scheme to the Scheduling Assignments when both criteria are met.

Figure 4:
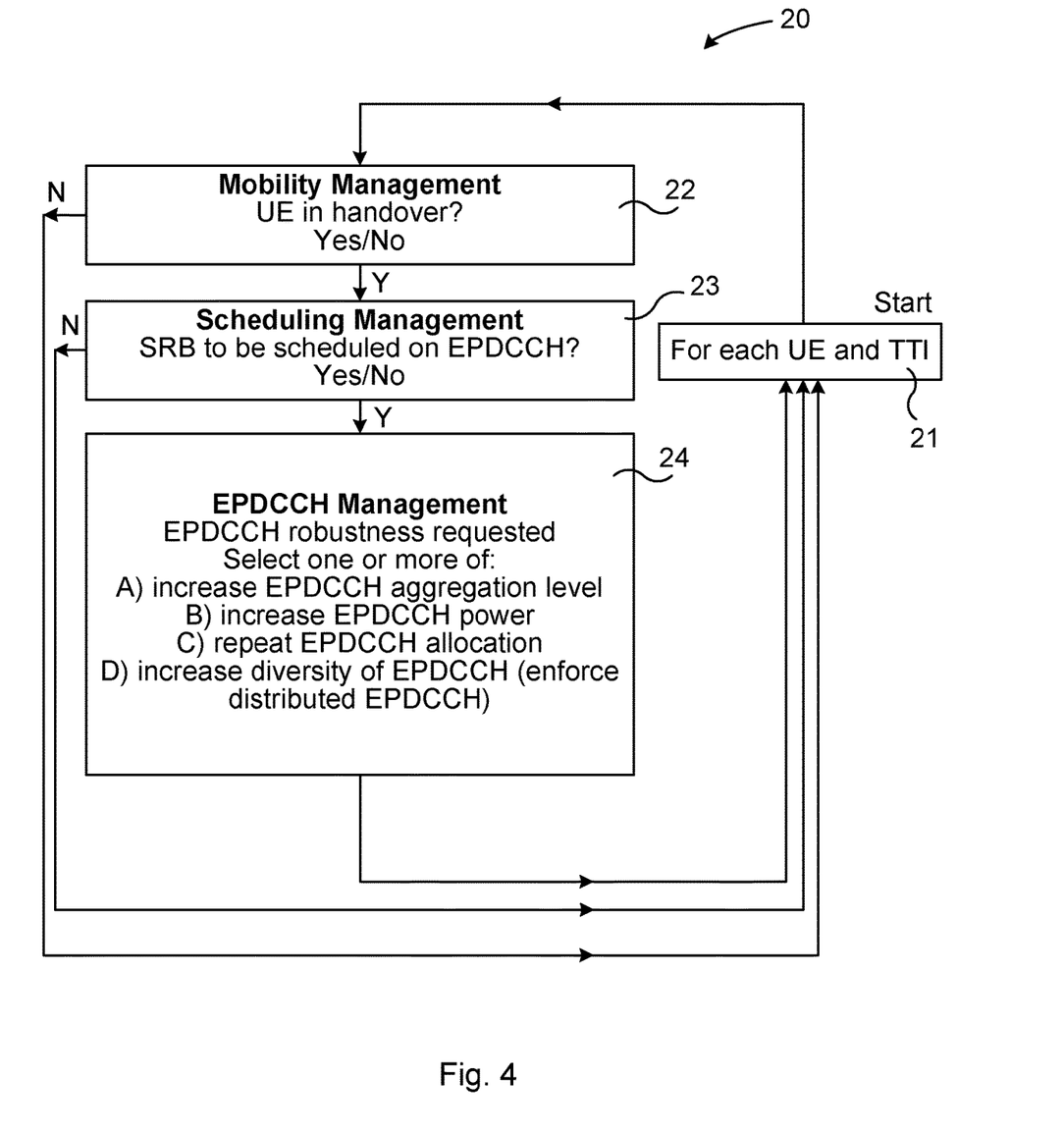
FIG. 4 is a flow chart of an embodiment of the present disclosure.

FIG. 4 is a flow chart of an embodiment of the present disclosure, and also indicates an interaction between the above described logical parts 9, 10, 11. All information required for implementing various embodiments of the present disclosure is hence available in the eNodeB 2a, 2b, 2c. Various embodiments can be implemented by combining the information of the mobility management 9, the scheduling management 10 and the EPDCCH management 11 in different ways and also with different level of precision, which is described next.

The flow 20 starts in box 21. For each UE 3 and each TTI it is first determined (in box 22) if the UE 3 is involved in a handover process or not. This information may for instance be available in the Mobility Management 9. In one embodiment, only this information is used and robustness of EPDCCH is increased for all scheduling assignments to the particular UE 3 being established to be in a handover process. The EPDCCH robustness may be increased in different ways, as illustrated in box 24: by adapting, in particular increasing, EPDCCH aggregation level, by adapting, in particular increasing, EPDCCH transmission power, by repeating EPDCCH allocation or by enforcing a distributed EPDCCH. These robustness increasing actions may also be combined in any way, i.e. each action may be combined with one or more of the other actions.

If the UE 3 is not involved in a handover process, flow returns to box 21, where it is again determined, for the next TTI, if the UE is involved in a handover process.

If the UE 3 is in a handover process flow continues to box 23, in which it may (but need not) be determined if an SRB and/or a DRB is to be scheduled for the UE 3. The Scheduling Management 10 comprises information on whether an SRB or a DRB is to be scheduled for a certain UE. In various embodiments, the information that the UE 3 is in a handover process may be combined with information in the scheduling management 10, e.g. increasing transmission power for scheduling assignments for the UE 3 for all SRB scheduling assignments (or performing any other of the mentioned actions for increasing EPDCCH robustness).

If no SRB is scheduled for the UE 3 in this TTI, then flow may again return to box 21.

If there is an SRB scheduled for the UE 3, then flow may continue to box 24, wherein any of the mentioned actions may be taken for the EPDDCH for this particular UE 3.

In some embodiments, flow may continue from box 22 directly to box 24 (not illustrated explicitly). In particular, flow continues from box 22 to box 24 in embodiments, in which only the fact that the UE is in a handover process is taken into consideration, irrespective of whether it also SRB scheduled for it.

In the EPDDCH management 11, various options are available as mentioned earlier. One or more of the actions may be applied for all Scheduling Assignments to the UE 3 involved in a handover process. Alternatively, one or more of the actions may be applied for all SRB Scheduling Assignments for the UE 3. Still another alternative is to combine information regarding "UE in handover process" and "SRB to be scheduled" and only apply one or more of the actions to the Scheduling Assignments when both criteria are met. This is a more resource efficient option, compared to the two first mentioned alternatives. The number of EPDCCH resources required to provide a scheduling grant to a UE depends on the radio conditions of the particular UE: a UE having poor radio conditions, e.g. due to being located in a coverage limited area, will require a higher number of EPDCCH resources. For instance, if the UE is located at cell edge, it may require 8 ECCEs (ECCE aggregation level 8) or 16 ECCEs (ECCE aggregation level 16) or still higher. By applying one or more of the actions on scheduling assignments for the UE that is in a handover process and having SRBs to be scheduled, the chances of a successful handover is increased. Further, the risk of needing to retransmit the EPDDCH to the UE is reduced, thus saving resources. Further, by performing one or more of the actions, e.g. increasing the transmission power, only on certain scheduling assignments, in particular scheduling assignments relating to handover, increase in created interference is also limited.

For each UE 3, information regarding Handover and bearer type (SRB/DRB) may be combined and an action for increasing EPDCCH robustness may be requested only for e.g. Scheduling Assignments from EPDCCH Management 11 in the case that the UE 3 is in a handover process and if, at the same time, an SRB is to be scheduled. Various embodiments for this application of one or more of the actions are described also with reference e.g. to FIG. 7.

It is noted that the actions may be used for other bearers as well, besides the SRB/DRB. Two examples of such other bearers comprise VoLTE bearers and VoLTE IMS control bearers. It is also noted that the action that is used by the currently serving eNodeB 2b for specific resources may be continued to be used by the target eNodeB 2c after the handover has been completed. For instance, the target eNodeB 2c that receives the UE may also apply the EPDCCH robustness improvement for all SRB-related Scheduling Assignments just after the handover provided that the UE is monitoring EPDCCH also in the target cell.

Figure 5:
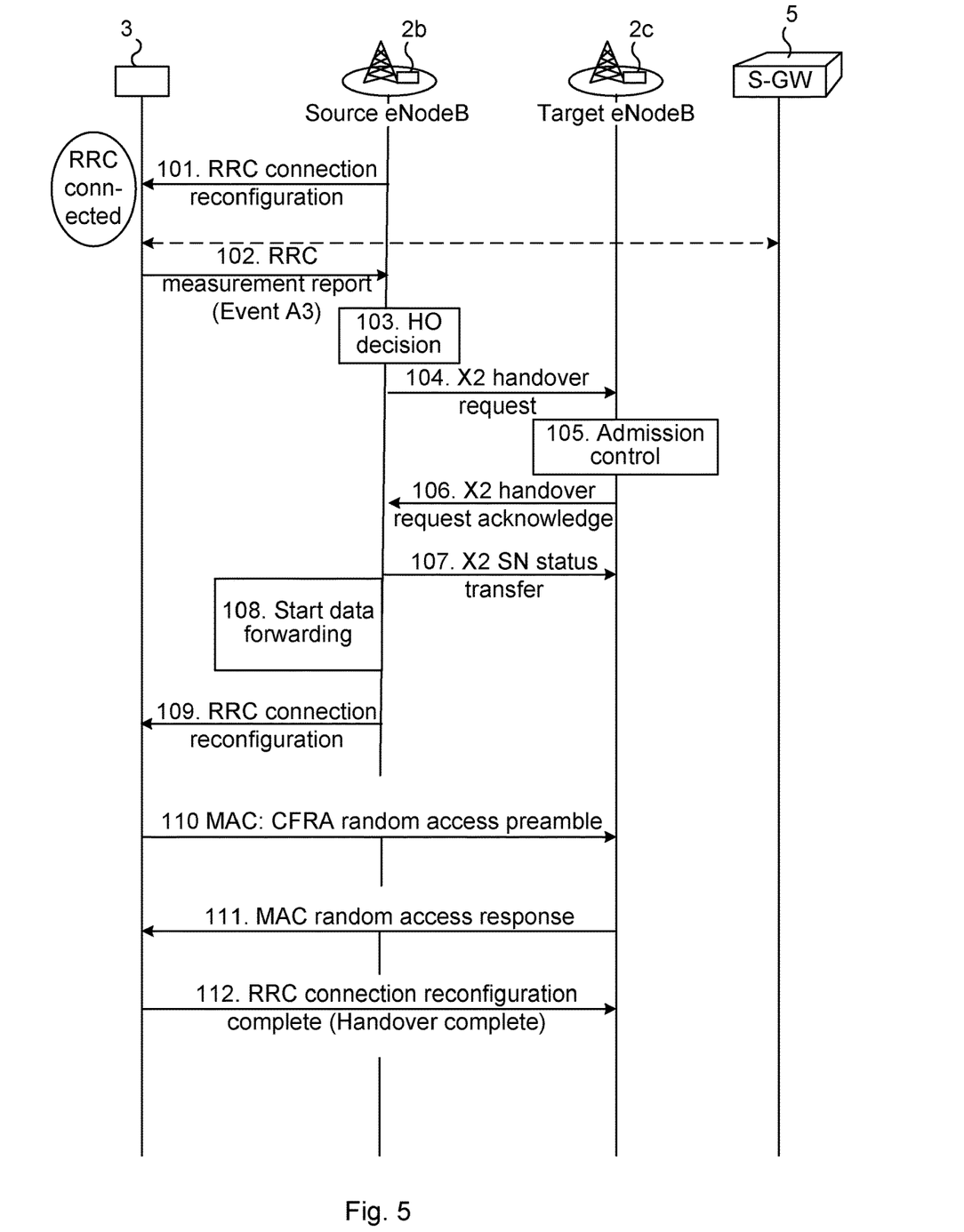
FIG. 5 is a signaling sequence of a handover procedure.

FIG. 5 is a signaling sequence of a handover procedure. It is noted that additional signaling, not illustrated in the figure, between the different nodes and UE may occur. It is again noted that the inter eNodeB handover case is used for describing different embodiments of the present disclosure, but that the teachings are applicable also for intra eNodeB handover.

At arrow indicated at reference numeral 101, the source eNodeB 2b sends a radio resource configuration (RRC) connection reconfiguration message to the UE 3, comprising bearer setup to the serving gateway 5 (indicated by double-headed arrow drawn with dashed line), measurement configurations etc. The UE 3 is then RRC connected.

At arrow indicated at reference numeral 102 the actual handover procedure begins, by the UE 3 sending an RRC measurement report to the source eNodeB 2b, i.e. to its serving eNodeB. This sending of the RRC measurement report may for instance be triggered by an Event A3 being fulfilled. Event A3 is a measurement report triggering event in LTE, wherein the UE 3 has measured that a neighboring eNodeB cell (also denoted target cell or neighboring cell here) has become a certain offset better than the serving eNodeB cell (or serving cell for short). In particular, the event A3 will trigger when the reference signal received power (RSRP) of reference signal from the neighboring cell is, for instance, 2 dB stronger that the RSRP of the currently serving cell. It is noted that other measurement events could alternatively be used, e.g. event A4, which triggers a measurement report to be sent by the UE 3 when the neighbor cell becomes better than an absolute threshold. It is also noted that the mentioning of 2 dB is provided purely as an example and that this is a configurable parameter which can alternatively be set to other values.

Further examples of events that could be used comprise, but are not restricted to, event A5, wherein serving cell becomes worse than a first threshold and neighbor cell becomes better than a second threshold, which is often used for inter frequency handover; and event B2, wherein serving cell becomes worse than a first threshold and inter radio access technology (RAT) neighbor cell becomes better than a second threshold, which is an event often used for inter-RAT handover.

In box indicated at reference numeral 103, a handover decision is made in the source eNodeB 2b. The decision on whether or not a handover is to be made for the UE 3 is made in response to the reception of the RRC measurement report.

At arrow indicated at reference numeral 104, the source eNodeB 2b sends a handover request to the target eNodeB 2c, e.g. over the X2 interface.

In box indicated at reference numeral 105, the target eNodeB 2C performs an admission control, comprising e.g. the target eNodeB 2c configuring the required resources according to information received from the source eNodeB 2b in the handover request.

At arrow indicated at reference numeral 106, after the admission control, the target eNodeB 2c sends a handover request acknowledgment to the source eNodeB 2b.

At arrow indicated at reference numeral 107, the source eNodeB 2b sends a sequence number (SN) status transfer message to the target eNodeB 2C to convey e.g. uplink Packet Data Convergence Protocol (PDCP) SN UE status.

At box indicated at reference numeral 108, the source eNodeB 2b may optionally start forwarding data intended for the UE 3 to the target eNodeB 2C.

At arrow indicated at reference numeral 109, the source eNodeB 2b sends an RRC connection reconfiguration message to the UE 3, comprising e.g. parameters, measurement configurations, etc. enabling the UE 3 to connect to the target eNodeB 2c cell. This message also comprises a handover command.

At arrow indicated at reference numeral 110, the UE 3 initiates, in this example, a contention free random access (CFRA) by transmitting, to the target eNodeB 2c cell, a CRFA random access preamble. Another possible option in 3GPP is to use a contention based random access (CBRA).

At arrow indicated at reference numeral 111, the target eNodeB 2c responds with an MAC random access response, comprising uplink allocation and timing advance (TA).

At arrow indicated at reference numeral 112, the UE sends an RRC connection reconfiguration complete to the target eNodeB 2c, confirming handover and indicating that the handover procedure is completed for the UE 3. This message comprising the handover complete ends the handover procedure.

The handover process referred to in relation to FIG. 4 may have any of the handover related events described with reference to FIG. 5 as starting point and endpoint. The handover process may have the time duration between any two events of the handover process described with reference to FIG. 5. For instance, the handover process may begin upon the A3 event being triggered (arrow 102) and end when the handover is completed (arrow 112) or some time period after being completed, e.g. controlled by a timer, or begin upon the A3 event being triggered and received by the eNodeB 2b and end upon the handover request being acknowledged by the target node 2c (arrow 106). The handover process may begin later, e.g. it may begin upon the source node 2b sending a handover request to the target node 2c (arrow 104) and end upon the source node 2b sending the RRC connection reconfiguration message to the UE 3. The handover process may thus be set to a number of different durations measured in time.

Figure 6:
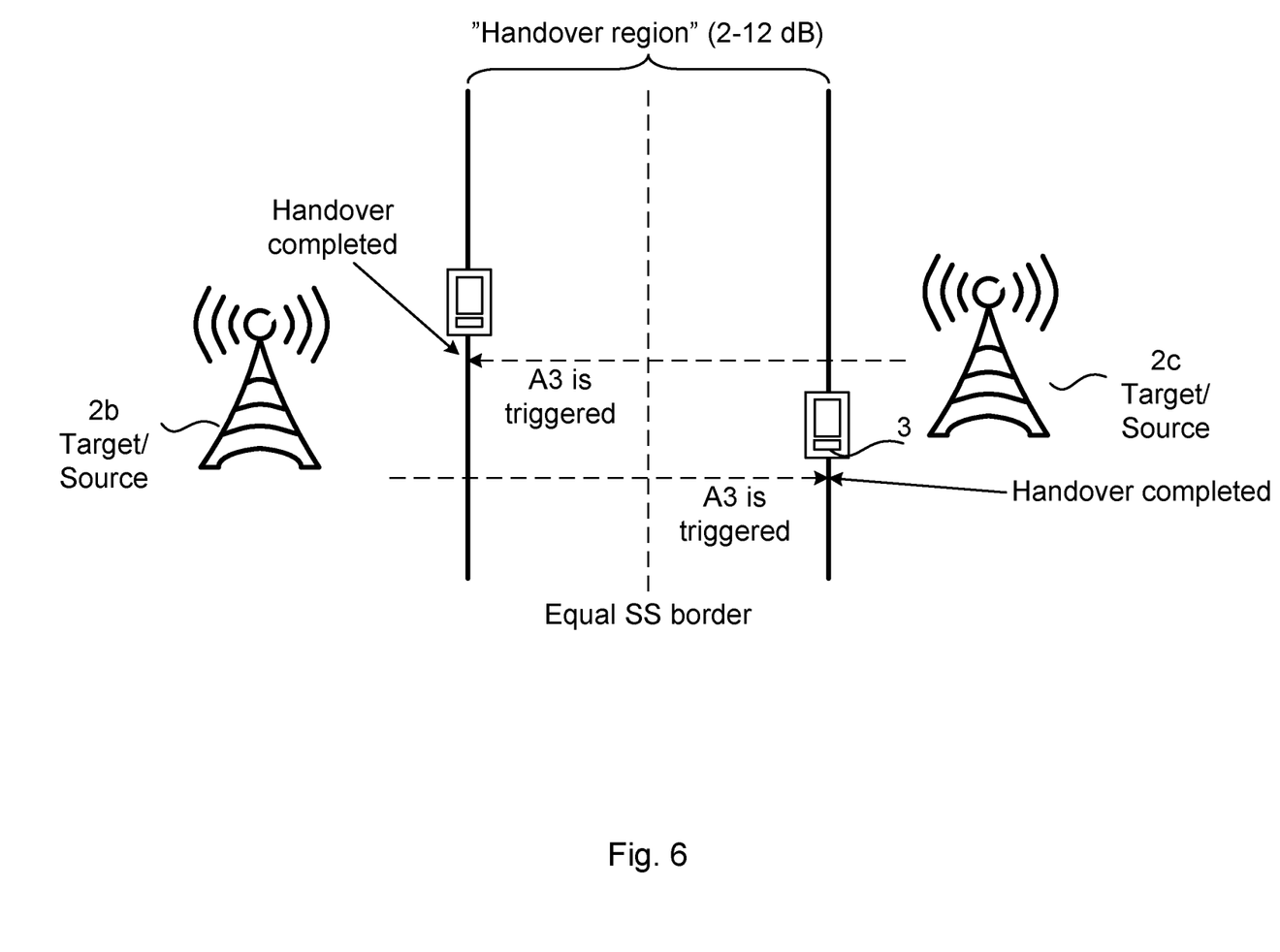
FIG. 6 illustrates a handover situation.

FIG. 6 illustrates a handover situation. A physical (geographical) handover region is indicated as a region between two vertical solid lines. The dashed line, "Equal SS border", indicates a border at which the UE 3 (moving in the handover region) experiences equal signal strength to both a cell controlled by a first access node 2b and a cell controlled by a second access node 2c. The UE 3 may initially have e.g. the first access node 2b as the serving node and the handover process may for instance be triggered when the signal strength to a cell controlled by the second access node 2C becomes more than a particular, typically predefined (configured), threshold value (handover margin) higher than signal strength to its currently serving cell, controlled by the first access node 2b. As a particular example, a handover margin of about 1-6 dB, may be set, i.e. a margin for when the signal strength to the target cell becomes a threshold value higher than the signal strength to the source cell may be between 1 dB and 6 dB, which translates to a handover region of about 2-12 dB (as the UE 3 can move in both directions between the cells of the access nodes 2b, 2c as illustrated by the horizontal dashed lines). Another particular example is a handover margin between 2-4 dB, which corresponds to a handover region of about 4-8 dB.

The handover process may, as mentioned earlier, start e.g. when an A3 event is triggered and end when the handover is complete. The time elapsed between these two points in the handover process may for instance be in the range of 50-100 ms, although it is noted that this is dependent on the particular case at hand. The handover process, during which time period the transmission power is increased, therefore translates into a negligible range in terms of dB. That is, the transmission power is increased for such short duration that the impact on the radio environment is minimized, i.e. the added interference from this transmission power increase towards other users is negligible.

As a particular example, a UE moving at pedestrian speed in the border region between two macro cells may be in the handover region for a time period in the order of minutes, whereas the described handover process typically completes in split-second time. Hence, elevating the power of scheduling assignments during the handover process can easily be in the order of 100 to 1000 times more efficient in terms of generated interference than e.g. simply elevating the power when the UE is in the handover region (during its entire duration therein).

The present teachings improve EPDCCH robustness for Scheduling Assignments to UEs that are monitoring EPDCCH and which are also involved in handover. As already mentioned this can be done with more or less precision: the EPDCCH robustness improvement may be applied for all scheduling assignments to an UE involved in handover or the EPDCCH robustness improvement may be applied for all SRB-related Scheduling Assignments. A more advanced and resource efficient approach is to combine several criteria. For instance, information for each UE regarding handover and bearer type may be combined. In such case the EPDCCH robustness improvement would only be used when sending Scheduling Assignments for a UE which is in handover and have an SRB to be scheduled. To use the EPDCCH robustness improvements for SRBs in general or, for any Scheduling Assignment during the Handover procedure may still result in a substantial waste of resources and as a consequence increased interference in the surrounding cells. However, by limiting the number of Scheduling Assignments to be protected, for example as just described, the benefit in handover performance can be achieved while the additional interference from the proposed solution is limited.

Figure 7:
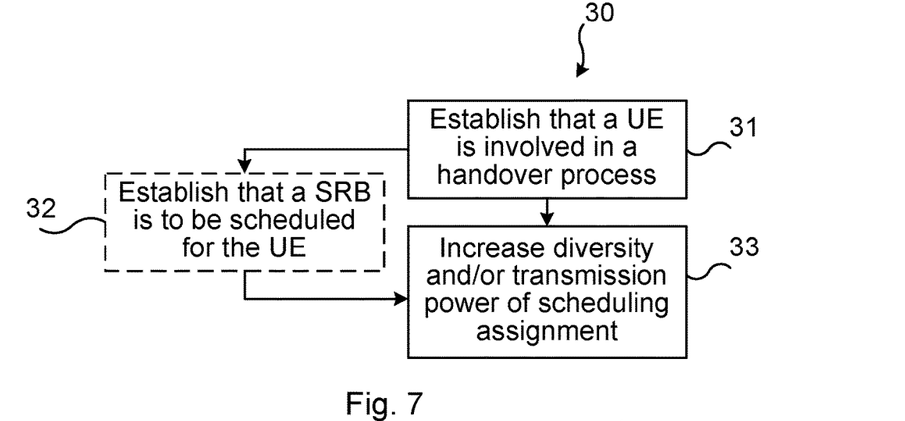
FIG. 7 illustrates a flow chart over steps of a method in a system in accordance with the present disclosure.

The various embodiments and features that have been described may be combined in different ways, examples of which are provided next, with reference first to FIG. 7.

FIG. 7 illustrates a flow chart over steps of a method in a communication system 1 in accordance with the present disclosure.

A method 30 relating to handover in a communication system 1 is provided. The handover that is performed may be a handover between cells controlled by different network nodes 2b, 2c or between cells controlled by a single network node.

The method 30 comprises establishing 31 that a communication device 3 is involved in a handover process from a first cell C1 to a second cell C2. For instance, it may be established that the communication device 3 is involved in a handover process by establishing that an event A3 triggered measurement report is received from the communication device 3. Examples of when the handover process starts (and ends) have been given earlier, and e.g. any of the messages of the handover process may be used to establish that the communication device 3 is in the handover process.

The method 30 comprises increasing 33 at least one of diversity and transmission power of a scheduling assignment transmitted on physical downlink control channel resources, wherein the physical downlink control channel resources are multiplexed with data resources in one or more orthogonal frequency division multiplexing, OFDM, symbols and wherein the scheduling assignment is specific for the communication device 3. The EPDCCH defined for LTE is an example of such physical downlink control channel wherein resources (ECCEs) are multiplexed with data resources, as has been described earlier.

In response to having established that a particular communication device 3 is in a handover process, the diversity and/or transmission power of a scheduling assignment pointing to resources may be increased, i.e. a diversity and/or power increase for a few particular physical downlink control channel resources (e.g. ECCEs).

The method provides an improved robustness for handover-related scheduling assignments in an interference limited part of a radio access network, by increasing for instance the transmission power of the handover related scheduling assignment only during a short duration and/or for some frequencies, e.g. only for some symbols and/or subcarriers (subcarriers in set of 12 subcarriers, together making up the frequency of PRBs or pairs of PRBs) of an EPDCCH. Improved robustness for handover is also provided in a coverage limited part of the radio access network by the method. The method thus ensures robustness in handover in high-interference environments as well as in areas having limited coverage. The method further provides the improved handover robustness with retained overall system capacity and in a highly resource efficient way. The method maximizes handover robustness in a highly resource efficient way compared to a more general increase of the system robustness by using more radio resources "just in case".

The method 30 may be implemented in a single network node 2b of the communication system 1, for instance in the currently serving radio access node 2b. In other embodiments, the method 30 may be implemented in a distributed fashion, wherein e.g. the establishing that the communication device 3 is in a handover process is performed in a network node such as the MME 4 or even in a server 8 of an external packet data network, and wherein the increasing of diversity and/or transmission power in response thereto is performed in the serving radio access node.

In an embodiment, the method 30 comprises, prior to the increasing 33 at least one of diversity and transmission power, establishing 32 that a signaling radio bearer is to be scheduled for the communication device 3, and wherein the increasing 33 comprises increasing at least one of diversity and transmission power for signaling radio bearer scheduling assignments. The robustness increase of the EPDCCH may hence be provided only for signaling radio bearers, and not for data signaling bearers. Also this embodiment reduces the risk of any interference adversely affecting other users being created by robustness scheme, e.g. by increasing the transmission power.

In an embodiment, the establishing 31 that the communication device 3 is in handover process comprises receiving (e.g. in the serving radio access node), from the communication device 3, a measurement report comprising an indication on signal strength to the second cell C2 (e.g. controlled by a second network node 2c) being more than a predefined threshold higher than signal strength to the first cell C1 (e.g. controlled by a first network node 2b). This measurement report may be a trigger that the handover process has begun and hence that the transmission power should be increased in response thereto.

In various embodiments, the establishing 31 comprises one or more of: establishing that a handover decision has been made in a first network node 2b controlling the first cell C1, establishing that a handover admission control has been made in a second network node 2c controlling the second cell C2, establishing that data for the communication device 3 is being forwarded from a first network node 2b controlling the first cell C1 to a second network node 2c controlling the second cell C2, or establishing that a first network node 2b controlling the first cell C1 has transmitted a radio connection reconfiguration message to the communication device 3. The handover process may be set to start upon various different events occurring, which enables the time period during which the transmission power is increased to be varied.

In an embodiment, the increasing 33 comprises increasing the transmission power of at least one enhanced control channel element, ECCE, specific for the communication device 3 during a specified time interval. This increasing 33 is performed in response to the establishing 31 that the communication device 3 is in handover process and possibly in response to the establishing 32 that an SRB is to be scheduled for the communication device 3. The time interval may for instance be from a first handover event of the handover process to a second handover event of the handover process, as described and exemplified earlier. The transmission power of the at least one ECCE specific for the communication device 3 is higher than the transmission power of ECCEs for the communication device 3 outside the time interval. Stated differently, the transmission power of signaling to the communication device 3 before the handover process starts and after the handover process ends is not as high as during the handover process.

In an embodiment, the increasing 33 comprises increasing transmission power of the scheduling assignment specific for the communication device 3 for only part of the physical downlink control channel. For instance, the transmission power may be increased only for one set of two sets of EPDCCH resources configured for the communication device 3.

In an embodiment, the increasing 33 comprises increasing diversity by distributing the physical downlink control channel resources over each physical resource block of at least two pairs of physical resource blocks configured for the communication device 3. For instance, for LTE and EPDCCH, the diversity may be increased by enforcing the use of distributed EPDCCH sets. Recalling that each communication device 3 that is configured to use EPDCCH, may have one or two EPDCCH sets, wherein each set comprises 2, 4 or 8 PRB-pairs in the data region. In this embodiment, the ECCEs are spread over all PRB pairs of at least one EPDCCH.

In an embodiment, the increasing 33 comprises increasing at least one of diversity and transmission power by increasing aggregation level of the physical downlink control channel resources.

In a variation of the above embodiment, the increasing of the aggregation level comprises increasing number of resources assigned to the physical downlink control channel of the communication device 3.

In a variation of the above two embodiments, the increasing 33 further comprises increasing transmission power.

When increasing the aggregation level, the number of ECCEs increases. These ECCEs may be located on different PRB pairs (different sub-carriers) on the same OFDM symbol (same point in time), i.e. spread over the system bandwidth. Hence, to increase aggregation level may thereby also entail an increased transmission power. The transmission power increase may also be accomplished by increasing the power of ECCEs located at different points in time.

In an embodiment, the increasing 33 comprises increasing diversity by transmitting the scheduling assignment at least twice in one transmission time interval. By such repeating of the scheduling assignment in a single transmission time interval an increased diversity is provided, and hence a higher probability that the assignment is received by the communication device 3. The repetition may be accomplished by sending the scheduling assignments in parallel, either at the same time but at different sub-carriers (i.e. within one OFDM symbol) or at same sub-carrier but at different times (i.e. in two or more OFDM symbols), or both depending on number of times that the assignment is repeated.

In various embodiments, the scheduling assignment specific for the communication device 3 relates to a handover command of a signaling radio bearer.

Figure 8:
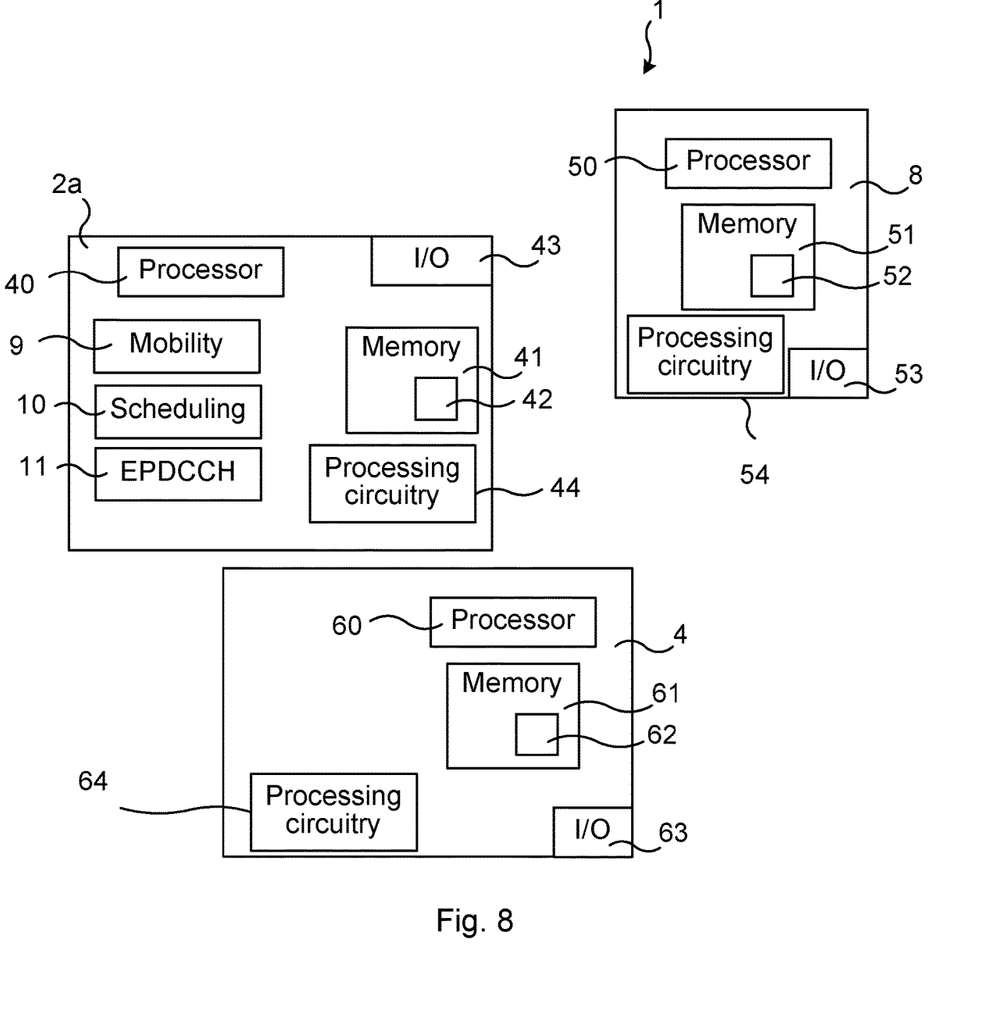
FIG. 8 illustrates schematically a system comprising one or several network nodes and means for implementing embodiments of the present teachings.

FIG. 8 illustrates schematically a communication system 1 comprising one or several network nodes 2a, 8, 4 and means for implementing embodiments according to the present teachings. The various embodiments of the method 30 as described e.g. in relation to FIG. 7 may be implemented in a single network node, e.g. in the radio access node 2a, 2b, 2c. That is, the method 30 may be executed in a single network node. In other embodiments, the method 30 may be implemented in the communication system 1 in a distributed fashion, wherein different functions/steps are performed by different devices or network nodes. As a particular example, some steps may be performed in the radio access node 2a, 2b, 2c while others are performed in the MME 4 or in a server 8 of a cluster of servers (e.g. Internet).

The communication system 1 described with reference to FIG. 3 is illustrated in a more schematic way in FIG. 8. In FIG. 8, three network nodes are shown, in particular a radio access node 2a (eNodeB), an MME 4 and a server 8 of the Internet. It is however noted that other, additional or fewer network nodes may be involved in executing the method 30.

Each of the network nodes 2a, 4, 8 or network devices illustrated in FIG. 8 comprises a respective processor 40, 60, 50. Each of the processors 40, 60, 50 may comprise any combination of one or more of a central processing unit (CPU), multiprocessor, microcontroller, digital signal processor (DSP), application specific integrated circuit etc. capable of executing software instructions stored in a respective memory 41, 61, 51 which can thus be a respective computer program product 41, 61, 51. The processors 40, 60, 50 can be configured to execute any of the various embodiments of the method for instance as described in relation to FIG. 7, or parts of the steps, i.e. wherein different steps of the method 30 are executed in different network nodes.

Each memory 41, 61, 51 can be any combination of read and write memory (RAM) and read only memory (ROM), Flash memory, magnetic tape, Compact Disc (CD)-ROM, digital versatile disc (DVD), Blu-ray disc etc. Each memory 41, 61, 51 may also comprise persistent storage, which, for example, can be any single one or combination of magnetic memory, optical memory, solid state memory or even remotely mounted memory.

Each network node 2b, 4, 8 may also comprise a respective input/output device 43, 63, 53 (indicated by I/O in the FIG. 9) for communicating with other network nodes and devices in the communication system. Each of the input/output devices 43, 63, 53 may for instance comprise a communication interface. The input/output devices 43, 63, 53 may e.g. communicate over a wired connection with other network node directly or via intermediate network nodes.

Each network node 2b, 4, 8 may also comprise a respective set of processing circuitry, which may adapted to perform the various steps of the method.

Each network node 2b, 4, 8 may also comprise further devices, circuitry etc. conventionally used. For instance, each or some of the network nodes 2b, 4, 8 may comprise or control antenna systems for wireless communication, comprise receiving circuitry and transmission circuitry.

In FIG. 8, the radio access node 2a is illustrated as comprising the earlier described (refer to FIGS. 3 and 4) logical parts 9, 10, 11: mobility management 9, scheduling management 10 and EPDCCH management 11. It is noted that the location of these logical parts 9, 10, 11 may, in other embodiments, be distributed among the different network nodes or be located in another network node than the radio access node 2a.

A communication system 1 is provided. The communication system 1 is configured to:

establish that a communication device 3 is involved in a handover process from a first cell C1 to a second cell C2, and increase at least one of diversity and transmission power of a scheduling assignment transmitted on physical downlink control channel resources, wherein the physical downlink control channel resources are multiplexed with data resources in one or more orthogonal frequency division multiplexing, OFDM, symbols and wherein the scheduling assignment is specific for the communication device 3.

The communication system 1 may be configured to perform the above steps e.g. b comprising one or more processors 40, 50, 60 and one or more memories 41, 61, 51, the memories 41, 61, 51, each containing instructions executable by the processors 40, 60, 50, whereby the memories 41, 61, 51 is operative to perform the steps.

In an embodiment, the communication system 1 is configured to, prior to the increasing at least one of diversity and transmission power, establish that a signaling radio bearer is to be scheduled for the communication device 3, and wherein the communication system 1 is configured to increase by increasing at least one of diversity and transmission power for signaling radio bearer scheduling assignments.

In an embodiment, the communication system 1 is configured to establish by receiving, from the communication device 3, a measurement report comprising an indication on signal strength to the second cell C2 being more than a predefined threshold higher than signal strength to the first cell C1.

In an embodiment, the communication system 1 is configured to establish by at least one of: establishing that a handover decision has been made in a first network node 2b controlling the first cell C1, establishing that a handover admission control has been made in a second network node 2c controlling the second cell C2, establishing that data for the communication device 3 is being forwarded from a first network node (2b) controlling the first cell C1 to a second network node 2c controlling the second cell C2, or establishing that a first network node 2b controlling the first cell C1 has transmitted a radio connection reconfiguration message to the communication device 3.

In an embodiment, the communication system 1 is configured to increase by increasing the transmission power of at least one enhanced control channel element, ECCE, specific for the communication device 3 during a time interval from a first handover event of the handover process to a second handover event of the handover process, wherein the transmission power of the at least one ECCE specific for the communication device 3 is higher than the transmission power of ECCEs for the communication device 3 outside the time interval.

In an embodiment, the communication system 1 is configured to increase by increasing transmission power of the scheduling assignment specific for the communication device 3 for only part of the physical downlink control channel.

In an embodiment, the communication system 1 is to increase by increasing diversity by distributing the physical downlink control channel resources over each physical resource block of at least two pairs of physical resource blocks configured for the communication device 3.

In an embodiment, the communication system 1 is configured to increase by increasing at least one of diversity and transmission power by increasing aggregation level of the physical downlink control channel resources.

In an embodiment, the communication system 1 is configured to increase the aggregation level by increasing number of resources assigned to the physical downlink control channel of the communication device 3.

In an embodiment, the communication system 1 is configured to increase by increasing power.

In an embodiment, the communication system 1 is configured to increase by increasing diversity by transmitting the scheduling assignment at least twice in one transmission time interval.

In various embodiments, the scheduling assignment specific for the communication device 3 relates to a handover command of a signaling radio bearer.

The present disclosure also encompasses computer program products 41, 51, 61 comprising a computer program 42, 52, 62 for a communication system 1 and a computer readable means on which the computer program 42, 52, 62 is stored. Each computer program 42, 52, 62 comprises computer program code, which, when executed on at least one processor in the communication system 1 causes the communication system 1 to perform the method 30 according to any of the described embodiments thereof.

The computer program products 42, 62, 52, or the memories, thus comprise instructions executable by a processor 40, 60, 50. Such instructions may be comprised in a computer program, or in one or more software modules or function modules.

Means are provided, e.g. function modules, that can be implemented using software instructions such as computer program executing in a processor and/or using hardware, such as application specific integrated circuits, field programmable gate arrays, discrete logical components etc., or any combination thereof.

In particular, a communication system is provided. The communication system comprises first means for establishing that a communication device is involved in a handover process from a first cell to a second cell. Such first means may comprise processing circuitry 44, 54, 64 adapted to detect an event triggering the handover process.

The communication system comprises second means for increasing at least one of diversity and transmission power of a scheduling assignment transmitted on physical downlink control channel resources, wherein the physical downlink control channel resources are multiplexed with data resources in one or more orthogonal frequency division multiplexing, OFDM, symbols and wherein the scheduling assignment is specific for the communication device. Such second means may comprise processing circuitry 44, 54, 64 adapted to perform such transmission power increase.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method relating to handover in a communication system, the method comprising:
    establishing that an interference level in a communication device coverage area exceeds a predetermined threshold and a communication device within the communication device coverage area is involved in a handover process from a first cell to a second cell, and
    responsive to establishing that the interference level in the communication device coverage area exceeds the predetermined threshold and the communication device within the communication device coverage area is involved in the handover process from the first cell to the second cell, increasing at least one of diversity and transmission power of a scheduling assignment related to the handover process and transmitted on physical downlink control channel resources, wherein:

the physical downlink control channel resources are multiplexed with data resources in one or more orthogonal frequency division multiplexing (OFDM) symbols;

the scheduling assignment is specific for the communication device; and the increasing is performed only for the scheduling assignment related to the handover process.

2. The method as claimed in claim 1, comprising, prior to the increasing at least one of diversity and transmission power, establishing that a signaling radio bearer is to be scheduled for the communication device, and wherein the increasing comprises increasing at least one of diversity and transmission power for signaling radio bearer scheduling assignments.

3. The method as claimed in claim 1, wherein the establishing comprises receiving, from the communication device, a measurement report comprising an indication on signal strength to the second cell being more than a predefined threshold higher than signal strength to the first cell.

4. The method as claimed in claim 1, wherein the establishing comprises at least one of: establishing that a handover decision has been made in a first network node controlling the first cell, establishing that a handover admission control has been made in a second network node controlling the second cell, establishing that data for the communication device is being forwarded from a first network node controlling the first cell to a second network node controlling the second cell, or establishing that a first network node controlling the first cell has transmitted a radio connection reconfiguration message to the communication device.

5. The method as claimed in claim 1, wherein the increasing comprises increasing the transmission power of at least one enhanced control channel element (ECCE) specific for the communication device during a time interval from a first handover event of the handover process to a second handover event of the handover process, wherein the transmission power of the at least one ECCE specific for the communication device is higher than the transmission power of ECCEs for the communication device outside the time interval.

6. The method as claimed in claim 1, wherein the increasing comprises increasing transmission power of the scheduling assignment specific for the communication device for only part of the physical downlink control channel.

7. The method as claimed in claim 1, wherein the increasing comprises increasing diversity by distributing the physical downlink control channel resources over each physical resource block of at least two pairs of physical resource blocks configured for the communication device.

8. The method as claimed in claim 1, wherein the increasing comprises increasing at least one of diversity and transmission power by increasing aggregation level of the physical downlink control channel resources.

9. The method as claimed in claim 8, wherein the increasing of the aggregation level comprises increasing number of resources assigned to the physical downlink control channel of the communication device.

10. The method as claimed in claim 8, wherein the increasing further comprises increasing power.

11. The method as claimed in claim 1, wherein the increasing comprises increasing diversity by transmitting the scheduling assignment at least twice within one transmission time interval.

12. The method as claimed in claim 1, wherein the scheduling assignment specific for the communication device relates to a handover command of a signaling radio bearer.

13. A non-transitory computer-readable storage medium comprising a computer program product including instructions to cause at least one processor to:

establish that an interference level in a communication device coverage area exceeds a predetermined threshold and a communication device within the communication device coverage area is involved in a handover process from a first cell to a second cell, and responsive to establishing that the interference level in the communication device coverage area exceeds the predetermined threshold and the communication device within the communication device coverage area is involved in the handover process from the first cell to the second cell, increase at least one of diversity and transmission power of a scheduling assignment related to the handover process and transmitted on physical downlink control channel resources, wherein:

the physical downlink control channel resources are multiplexed with data resources in one or more orthogonal frequency division multiplexing (OFDM) symbols;

the scheduling assignment is specific for the communication device; and the instructions cause the at least one processor to increase the at least one of diversity and transmission power only for the scheduling assignment related to the handover process.

14. A communication system for handover, the communication system being configured to:

establish that an interference level in a communication device coverage area exceeds a predetermined threshold and a communication device within the communication device coverage area is involved in a handover process from a first cell to a second cell, and responsive to establishing the interference level in the communication device coverage area exceeds the predetermined threshold and that the communication device within the communication device coverage area is involved in the handover process from the first cell to the second cell, increase at least one of diversity and transmission power of a scheduling assignment related to the handover process and transmitted on physical downlink control channel resources, wherein:

the physical downlink control channel resources are multiplexed with data resources in one or more orthogonal frequency division multiplexing (OFDM) symbols;

the scheduling assignment is specific for the communication device; and the communication system is configured to increase the at least one of diversity and transmission power only for the scheduling assignment related to the handover process.

15. The communication system as claimed in claim 14, configured to, prior to the increasing at least one of diversity and transmission power, establish that a signaling radio bearer is to be scheduled for the communication device, and wherein the communication system is configured to increase by increasing at least one of diversity and transmission power for signaling radio bearer scheduling assignments.

16. The communication system as claimed in claim 14, configured to establish by receiving, from the communication device, a measurement report comprising an indication on signal strength to the second cell being more than a predefined threshold higher than signal strength to the first cell.

17. The communication system as claimed in claim 14, configured to establish by at least one of: establishing that a handover decision has been made in a first network node controlling the first cell, establishing that a handover admission control has been made in a second network node controlling the second cell, establishing that data for the communication device is being forwarded from a first network node controlling the first cell to a second network node controlling the second cell, or establishing that a first network node controlling the first cell has transmitted a radio connection reconfiguration message to the communication device.

18. The communication system as claimed in claim 14, further configured to increase by increasing the transmission power of at least one enhanced control channel element (ECCE) specific for the communication device during a time interval from a first handover event of the handover process to a second handover event of the handover process, wherein the transmission power of the at least one ECCE specific for the communication device is higher than the transmission power of ECCEs for the communication device outside the time interval.

19. The communication system as claimed in claim 14, further configured to increase by increasing transmission power of the scheduling assignment specific for the communication device for only part of the physical downlink control channel.

20. The communication system as claimed in claim 14, configured to increase by increasing diversity by distributing the physical downlink control channel resources over each physical resource block of at least two pairs of physical resource blocks configured for the communication device.

21. The communication system as claimed in claim 14, configured to increase by increasing at least one of diversity and transmission power by increasing aggregation level of the physical downlink control channel resources.

22. The communication system as claimed in claim 21, configured to increase the aggregation level by increasing number of resources assigned to the physical downlink control channel of the communication device.

23. The communication system as claimed in claim 21, configured to increase by increasing power.

24. The communication system as claimed in claim 14, configured to increase by increasing diversity by transmitting the scheduling assignment at least twice in one transmission time interval.

25. The communication system as claimed in claim 14, wherein the scheduling assignment specific for the communication device relates to a handover command of a signaling radio bearer.

26. A method relating to handover in a communication system, the method comprising:
  establishing that an interference level in a communication device coverage area exceeds a predetermined threshold and a communication device within the communication device coverage area is involved in a handover process from a first cell to a second cell, and
  responsive to establishing that the interference level in the communication device coverage area exceeds the predetermined threshold and the communication device within the communication device coverage area is involved in the handover process from the first cell to the second cell, increasing diversity of a scheduling assignment transmitted on physical downlink control channel resources, wherein the physical downlink control channel resources are multiplexed with data resources in one or more orthogonal frequency division multiplexing (OFDM) symbols and wherein the scheduling assignment is specific for the communication device.

* * * * *